Aug. 14, 1951  H. R. MORRISON  2,564,494
BROADCASTER
Filed Aug. 10, 1950  5 Sheets-Sheet 1

INVENTOR:
HENRY R. MORRISON.

BY Eaton + Bell

ATTORNEYS

Aug. 14, 1951     H. R. MORRISON     2,564,494
BROADCASTER

Filed Aug. 10, 1950     5 Sheets-Sheet 3

INVENTOR:
HENRY R. MORRISON.

BY Eaton + Bell

ATTORNEY

Aug. 14, 1951 H. R. MORRISON 2,564,494
BROADCASTER
Filed Aug. 10, 1950 5 Sheets-Sheet 4
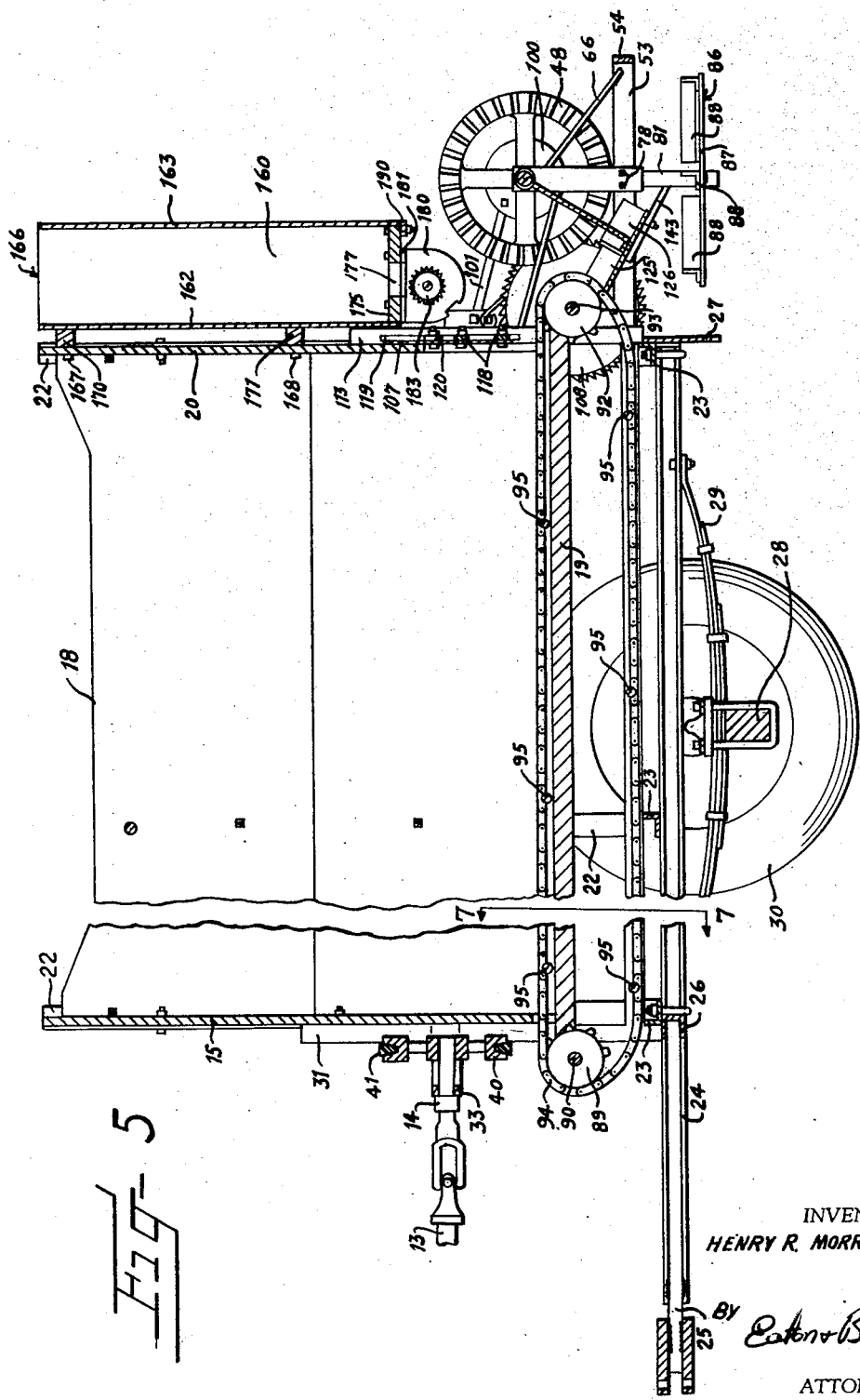
INVENTOR:
HENRY R. MORRISON.
BY Eaton+Bell
ATTORNEYS Aug. 14, 1951     H. R. MORRISON     2,564,494
BROADCASTER
Filed Aug. 10, 1950     5 Sheets-Sheet 5
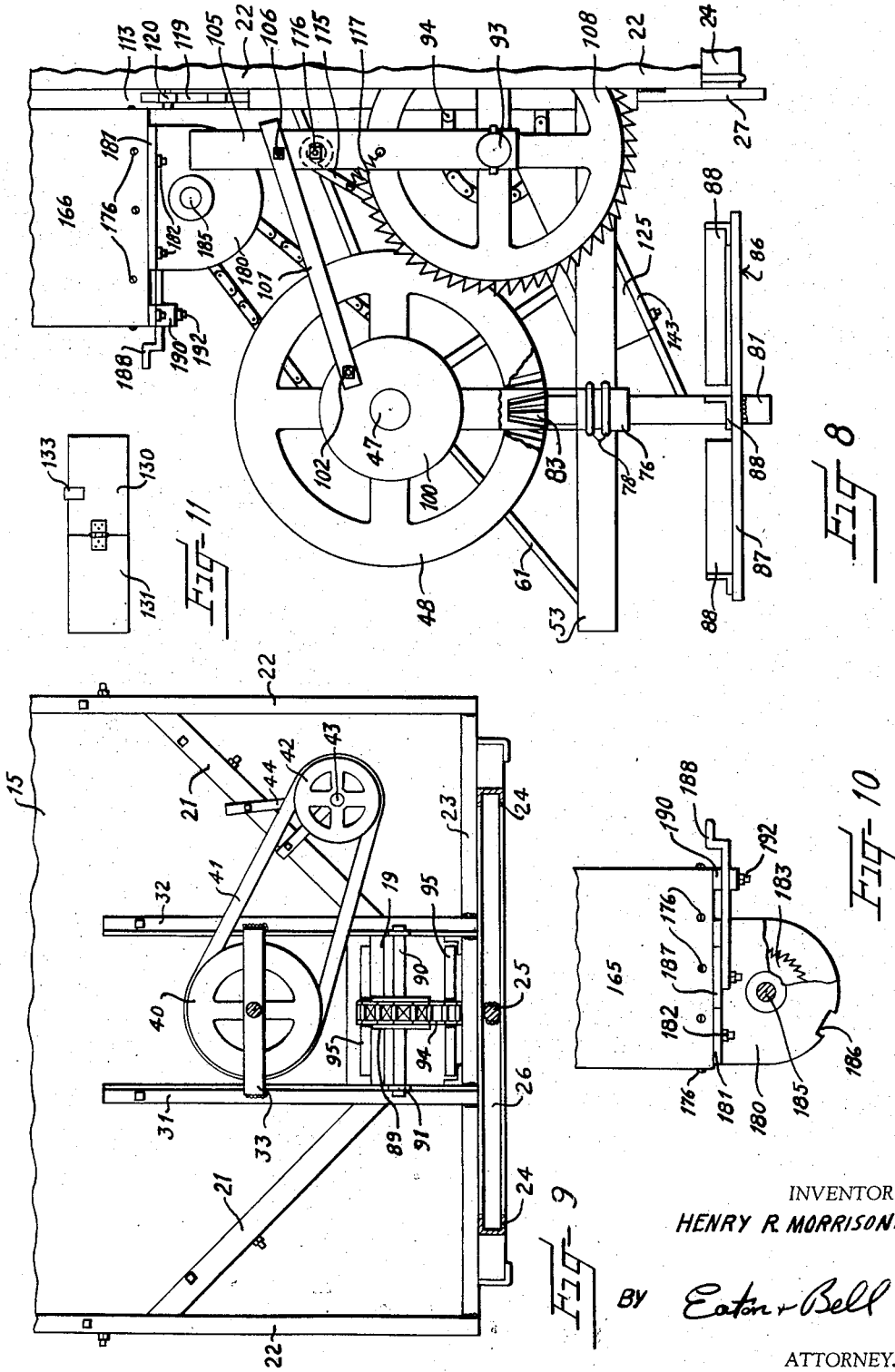
INVENTOR:
HENRY R. MORRISON.
BY Eaton + Bell
ATTORNEYS Patented Aug. 14, 1951

2,564,494

UNITED STATES PATENT OFFICE 2,564,494

BROADCASTER

Henry R. Morrison, Mooresville, N. C.

Application August 10, 1950, Serial No. 178,579

4 Claims. (Cl. 275—8)

This invention relates to a broadcaster and especially to the type of broadcaster having a hopper adapted to contain fertilizer and the like and also having a smaller hopper adapted to contain seed the smaller hopper being secured to the larger hopper, and the broadcaster being provided with means for distributing and broadcasting the fertilizer and seeds from the two hoppers.

It is an object of this invention to provide a distributing broadcaster having a fertilizer hopper with a bed extending longitudinally of the bottom thereof and an endless conveyor extending along said bed, said endless conveyor being provided with a plurality of bars for moving the fertilizer in said hopper to the end of the hopper to be discharged therefrom and said hopper having a second hopper or seed hopper secured to the rear thereof and means for releasing seeds from the seed hopper and said broadcaster also being provided with a pair of rotors or fans underneath the seed hopper and fertilizer hopper so that the fertilizer and seeds falling upon said fans will be distributed and broadcast as desired, and means for deflecting the seeds and fertilizer to cause the same to fall upon one or both of the fans as desired.

It is another object of this invention to provide in a device of the type described, additional means secured between the discharge end of the fertilizer hopper and the discharge end of the seed hopper to deflect the seeds and fertilizer being discharged therefrom to cause the seeds and said fertilizer to strike the fans at any desired point to thus cause them to be distributed in a line tangent to the circumference of the fans, and said means being adjustable to change the angle at which the seeds and fertilizer are distributed.

Some of the objects of the invention having been stated, other objects will appear as the description proceeds when taken in connection with the accompanying drawings, in which—

Figure 5 is a longitudinal sectional view taken along the line 5—5 in Figure 3;

Figure 6 is an inverted sectional plan view looking up along the line 6—6 in Figure 3;

Figure 7 is an enlarged fragmentary vertical sectional view taken along the line 7—7 in Figure 5;

Figure 8 is an enlarged side elevation looking along the line 8—8 in Figure 2;

Figure 9 is an enlarged front elevation with parts broken away and is taken substantially along the line 9—9 in Figure 1;

Figure 10 is an enlarged fragmentary elevation of the distributor at the side of the seed hopper;

Figure 11 is an elevation of the hinged deflecting plate removed from the broadcaster.

Figure 1:
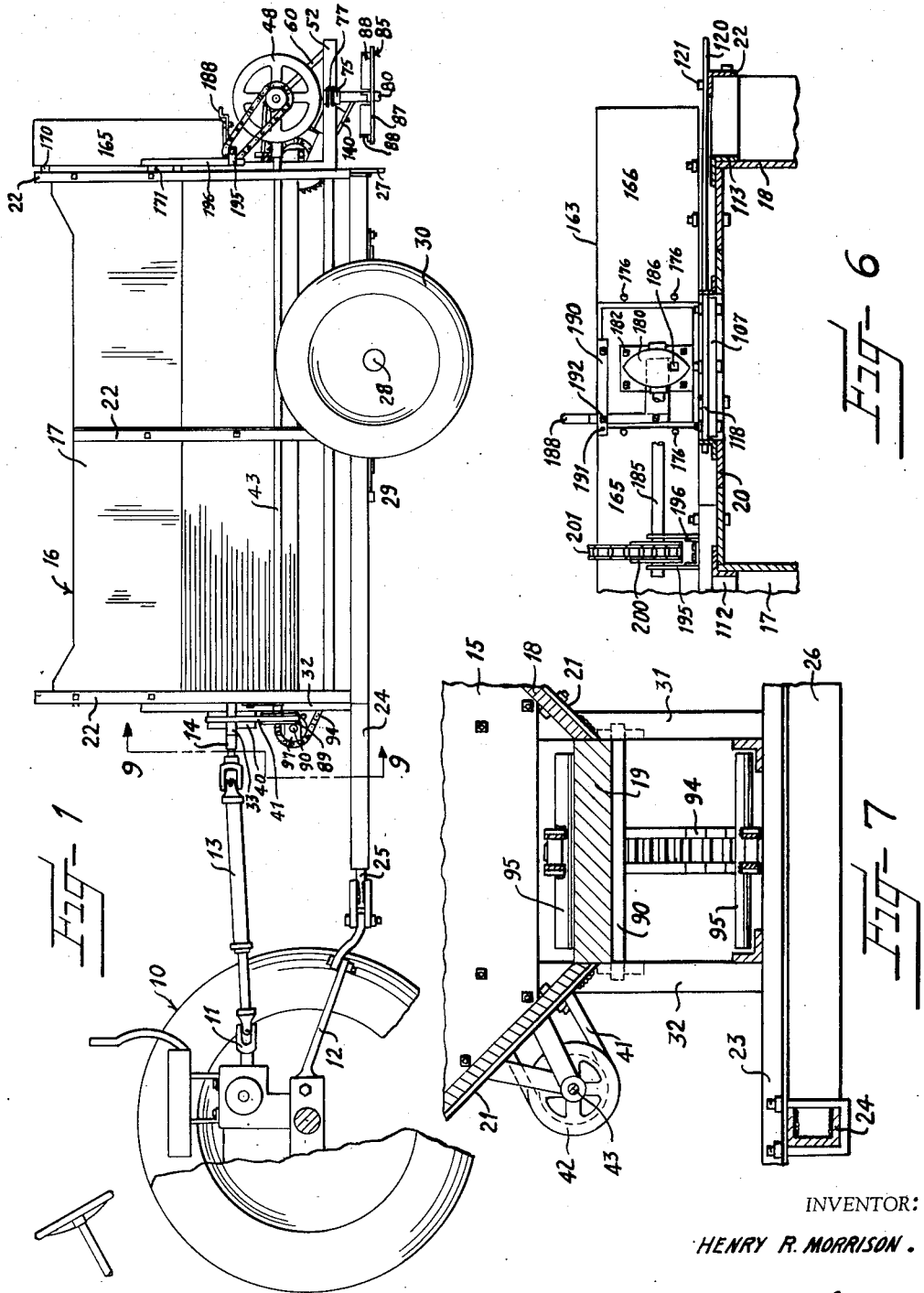
Figure 1 is a side elevation of the improved broadcaster showing the same attached to the rear end of a tractor, parts of the tractor being broken away.
Figure 2:
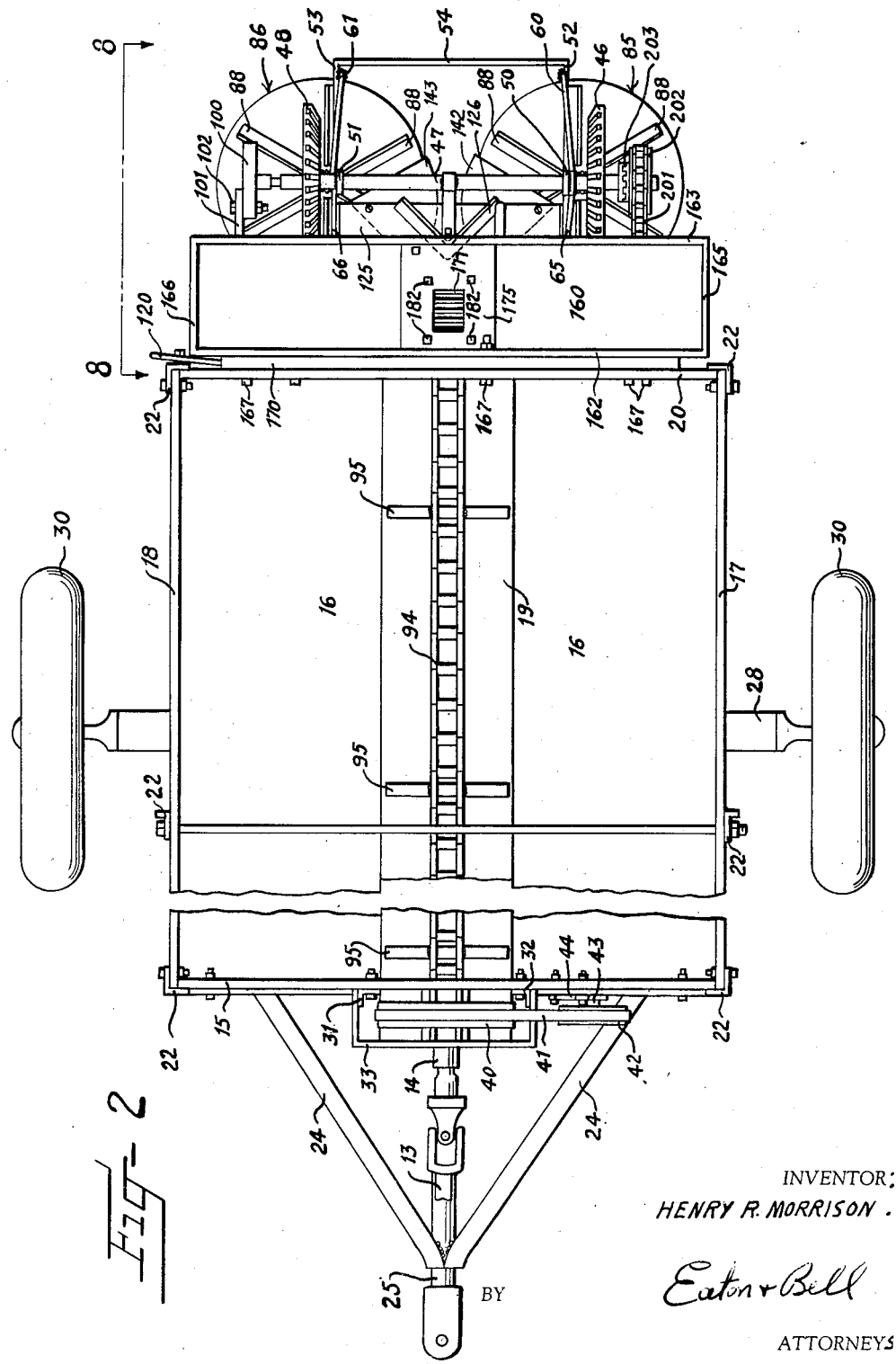
Fig. 2 is a top plan view of the broadcaster removed from the tractor.

Referring more specifically to the drawings, the numeral 10 broadly designates the rear portion of a tractor having a conventional power take-off 11 thereon and a connecting bar 12 to which implements may be attached. The power take-off 11 is attached to a connecting link 13 which is universally connected to a shaft 14 rotatably mounted on the front end wall 15 of a hopper 16 adapted to carry fertilizer and the like having side walls 17 and 18 and a bed plate 19 extending longitudinally thereof, and a rear end wall 20. The lower portions of the side walls 17 and 18 converge inwardly toward each other and are supported by a plurality of brace members such as angle irons 21.

The hopper 16 is mounted in a frame comprising a plurality of vertically disposed support members in the form of angle irons 22 having their lower ends secured to a plurality of horizontally disposed support members in the form of angle irons 23 supported by longitudinally extending channel members 24. The channel members 24 extend forwardly and converge toward each other and have the front ends thereof secured to a connecting bar 25 for connecting the broadcaster to the tractor connecting bar 12.

A transverse plate 26 extends between and has its opposed ends secured to the channel members 24 adjacent the foremost angle irons 22. The rearmost end of the connecting bar 25 is secured intermediate the ends of the transverse plate 26. A second transverse plate 27 extends between the lowermost ends of the rearmost angle irons 22 and is secured thereto and to the rearmost ends of the channel members 24 to complete the frame of the broadcaster.

The frame is supported by an axle 28 suitably secured to the lower surface of the channel members 24 and having a wheel 30 rotatably mounted on each end thereof and provided with suitable springs 29.

A pair of spaced vertically disposed members such as angle irons 31 and 32 have their lower ends secured to the transverse angle iron 23 and extend upwardly and are secured to the front wall 15 of the hopper 16. A bracket 33 extends between the members 31 and 32 and the rear end of the shaft 14 connected to the power take-off of the tractor 10 is rotatably mounted in the bracket 33 and a sheave 40 is fixedly mounted thereon which carries a V-belt 41 which extends over a sheave 42 fixedly secured to a shaft 43, rotatably mounted in a bracket 44 secured to the support member 21 and the shaft 43 which extends longitudinally of the hopper 16 and is rotatably mounted in a bearing, not shown, secured to the rearmost support member 21 and is provided with a bevel gear 45 secured to the rearmost end thereof. The bevel gear 45 meshes with a bevel gear 46 fixedly mounted on one end of a transversely extending shaft 47 having a bevel gear 48 fixedly mounted on the other end thereof. The shaft 47 is rotatably mounted in support members 50 and 51 suitably secured to horizontal portions 52 and 53, respectively, of an auxiliary frame also having a transverse portion 54, the portions 52, 53 and 54 forming the auxiliary frame and being suitably secured to each other and the foremost ends of the portions 52 and 53 are secured to the lower ends of vertical members 55 and 56 secured in spaced relation to each other on the support members 21 and 22.

A pair of brace rods 60 and 61 have their lower ends suitably secured to the respective portions 52 and 53 of the auxiliary frame, as by welding, and the brace rods 60 and 61 extend upwardly and forwardly and are secured at their upper ends to support members 50 and 51, as by welding. Brace rods 65 and 66 are secured at their rear ends to the support members 50 and 51, respectively, and the brace rods 65 and 66 extend forwardly and are suitably secured to vertical members 55 and 56.

Bearings 75 and 76 are secured to the outer surfaces of the frame members 52 and 53, respectively, as by U-bolts 77 and 78 and the bearings 75 and 76 are disposed in the same vertical plane as the shaft 47 and have rotatably mounted therein vertically disposed shafts 80 and 81 having bevel gears 82 and 83 meshing with the bevel gears 46 and 48, respectively. Fixedly secured to the lower ends of the shafts 80 and 81 are rotors or fans 85 and 86, each of the rotors 85 and 86 being identical and comprising a circular plate 87 having a plurality of radially extending angle irons 88 suitably secured thereto as by welding.

It is thus seen that rotation is transmitted from the power take-off 11 through the shaft 43 and gears 45, 46, 48, 82 and 83 to rotate the rotors 85 and 86 which are adapted to distribute material such as fertilizer and seeds deposited thereon to each side of the broadcaster.

The bed plate 19 extends longitudinally of the hopper 16 and sprocket wheel 89 is rotatably mounted on a shaft 90 fixed in a bracket 91 secured to the members 31 and 32 adjacent the front of the bed plate 19 in Figure 1 and a similar sprocket wheel 92 is mounted on a shaft 93 mounted in a manner to be described at the rear end of the bed plate 19 as may be observed in Figure 5, the sprocket wheels 89 and 92 being disposed below the bed plate 19 and having an endless conveyor 94 extending thereabout so that the lower surface of the upper reach of the conveyor 94 will move along the top surface of the bed plate 19. Secured to the conveyor 94 at spaced intervals are a plurality of pipes 95 of substantially the same width as the bed plate 19 to cause rearward movement of material on the bed plate 19 as the endless conveyor 94 is moved in a clockwise direction in Figure 5.

Means are provided for transmitting rotation to the sprocket wheels 89 and 92 for moving the conveyor 94 comprising a cam wheel 100 fixedly secured to the right-hand end of the shaft 47 (Figures 3 and 4) having an arm 101 pivotally secured in off center relation thereto as by a bolt 102. The arm 101 extends forwardly from the shaft 47 and has its front end pivotally and adjustably connected to a vertical bar 105 as by a bolt 106. The bar 105 has its lower end rotatably mounted on the shaft 93 on which the sprocket wheel 92 is mounted, the shaft 93 extending transversely of the broadcaster and having a ratchet wheel 108 fixedly mounted thereon. The shaft 93 is rotatably mounted in a bearing 110 secured to an arm, not shown, suitably secured to the vertical member 56 and the end of the shaft 93 remote from the ratchet wheel 108 is mounted in a bearing bracket 111 secured to a vertically extending angle arm 112 secured adjacent the bed plate 19 of the conveyor, there being a similar vertically extending angle arm 113 secured adjacent the other side of the bed plate 19 for supporting the same at the rear of the distributor.

The bar 105 has a dog 115 rotatably secured thereto as at 116 and a tension spring 117 is secured to the free end of the dog 115 and to the vertical bar 105 and normally urges the dog 115 in a counter-clockwise direction in Figure 8. Referring to Figure 8, it will be observed that the dog 115 engages the teeth of the ratchet wheel 108 and upon rotation of the shaft 47 rotation will be imparted to the cam wheel 100 to cause the arm 101 to move to the left in Figure 8 whereby the dog 115 in engagement with the teeth on the ratchet wheel 108 will transmit step-by-step movement to the ratchet wheel 108 thus transmitting step-by-step movement to the sprocket wheels 89 and 92 to move the endless conveyor 94 to cause the material disposed within the hopper 16 to be moved to the rear thereof.

The rear wall 20 of the hopper 16 has an opening 116 to permit material such as fertilizer disposed within the hopper 16 to be distributed from the rear end of the hopper as the conveyor 94 is moved along the bed plate 19. The angle irons 112 and 113 are secured to the rear wall 20 of the hopper 16 at the opposed edges of the opening 116 and serve as guides for a gate 107 having a plurality of transverse bars 118 suitably secured thereto and the angle irons 112 and 113 each have a vertically extending slot 119 therein which is slidably penetrated by the ends of the transverse bars 118.

A lever 120 has one end pivotally secured to the upper end of the gate 107 and extends outwardly through the slot 119 in the angle iron 113 and is adjustably positioned on one of the rearmost frame members 22 by means of a pin 121 and a plurality of bores 122 in the frame member 22. The lever permits adjustment of the gate 107 to regulate the size of the opening 116 and to control the amount of material that is discharged from the hopper 16.

A chute in the form of a plate 125 is disposed beneath the rear end of the conveyor 94 and extends between the frame members 52 and 53 and is suitably secured thereto as by welding.

The chute 125 extends at an angle relative to the vertical as may be observed in Figure 5 and its upper front end is disposed directly beneath the discharged end of the conveyor 94 and its lower rear end is disposed above the rotors 85 and 86 but in spaced relation thereto. It is thus seen that when material is discharged from the discharge end of the conveyor 94 onto the chute 125 it will slide down the chute 125 onto the rotors 85 and 86 and as the rotors 85 and 86 are rotated, the material will be distributed from the rotors to each side of the broadcaster.

Suitably secured to the centermost portion of the chute 125, as by welding, is a material diverting plate member 126 bent at right angles and having its apex disposed in line with the center of the bed plate 19 to thus cause the material being discharged from the conveyor 94 onto the chute 125 to be diverted on each side of the member 126 onto the rotors 85 and 86.

If it is desired to have the material from the hopper 16 fall onto only one of the rotors 85 and 86 a hinged plate member may be provided having portions 130 and 131 so that the portion 130 may be secured to the material diverting member 126 as by a removable spring clamp 133 and the portion 131 may be moved in alinement with the portion 130 and with the hinge point disposed below the apex of the member 126 so that the free end of the portion 130 will be disposed adjacent the right-hand edge of the bed plate 19 in Figure 4 so that material discharged from the conveyor 94 will be caused to slide along the hinged portions 130 and 131 to fall only on the rotor 85 and not on the rotor 86. If desired, the hinged member may be secured to the other side of the material diverting member 126 to direct material from the conveyor 94 to the rotor 86 instead of the rotor 85. When it is desired to use both rotors the hinged member may be disposed with its hinge point at the apex of the member 126 and with the portions 130 and 131 disposed in parallel relation to the walls of the member 126 and flush therewith.

Oscillatably secured to the lower surface of the chute 125 as by bolts 140 and 141 are segmental plate members 142 and 143. The segmental plate members 142 and 143 may be manually moved to any desired position to extend the surface of the chute 125 rearwardly over the rotors 85 or 86 as desired.

When the segmental plate members 142 and 143 are disposed completely underneath the chute 125 so that no portion thereof extends beyond the rearmost end of the chute 125, material falling from the chute 125 onto the rotors 85 and 86 will hit the rotors 85 and 86 at a point substantially directly beneath the rearmost end of the chute 125 and will be distributed from the rotors in a line tangent thereto extending from this point. Now by moving the segmental plate members 142 and 143 outwardly about the pivot points 140 and 141 the material from the chute 125 will strike the rotors 85 and 86 at a different place and will thus be distributed in a line tangent to this point on the rotors. It is thus seen that by use of the novel segmental plates 142 and 143 the material falling from the chute may be directed to a desired point on the rotors 85 and 86 to thus vary the angle at which the material is broadcast from the rotors.

By use of the novel segmental plate members 142 and 143 and the novel material diverting members 126 with the hinged plates 130 and 131 material may be distributed more efficiently than has heretofore been possible in that by using these novel means material may be distributed to one or both sides of the broadcaster as desired and the angle at which the material is distributed may be changed as desired.

As has heretofore been stated, the hopper 16 may contain any suitable material and is preferably used for fertilizer and the like to permit the fertilizer to be discharged from the rear end of the hopper by the conveyor 94 onto the chute 125 and onto the rotors 85 and 86 to be broadcast to one or both sides of the broadcaster.

Now, it is frequently desirable to distribute and broadcast other material at the same time the fertilizer is broadcast, and to this end, there is provided a second hopper broadly designated at 160 which may be used for storing any suitable material such as seeds and the like and which is preferably formed with a front wall 162, a rear wall 163 and side walls 165 and 166, forming a hopper in the shape of an inverted truncated triangle. The bottom of the hopper 160 is disposed substantially midway of the vertical height of the broadcaster. The hopper 160 is secured to the rear wall 20 of the hopper 16 in any suitable manner as by bolts 167 and 168 penetrating spacer members 170 and 171, the spacer members 170 and 171 extending transversely of the broadcaster and holding the hopper 160 in spaced relation to the rear wall 20 of the hopper 16.

The lower portion of the hopper 160 is provided with a bottom plate member 175 suitably secured thereto as by bolts 176 and the bottom plate member 175 has an opening 177 therein. Disposed immediately below the opening 177 is a mixing device of conventional or other construction which comprises a housing 180 having a flange 181 suitably secured to the bottom plate 175 as by bolts 182 and a toothed wheel 183 is fixedly mounted on a shaft 185, the shaft 185 being rotatably mounted on the side walls of the housing 180 and extending to the left in Figure 3.

The toothed wheel 183 is disposed within the housing 180 directly beneath the opening 177 in the bottom plate 175 so that material such as seeds falling through the opening 177 in the bottom plate 175 will strike against the toothed wheel 183 which when rotating will break up the seeds and separate them and move them to the bottom portion of the housing 180 which is provided with an opening 186 to permit the material such as seeds to be discharged therefrom onto the chute 125 at substantially the same point at which material from the conveyor 94 is discharged onto the chute 125 so that the material from the hopper 160 will be distributed in a like manner to the material from the hopper 16. The toothed wheel 183 acts as agitating means to facilitate the discharge of material from the hopper 160.

In order to regulate the amount of seeds or other material falling from the hopper 160 through the opening 177 in the bottom plate 175, there is provided a closure plate 187 mounted for transverse sliding movement against the lower surface of the bottom plate 175 and penetrating the wall of the housing 180. The closure plate 187 has a handle 188 suitably secured thereto and extending rearwardly at a right angle therefrom, said handle 188 being mounted for transverse sliding movement in a bracket 190, the bracket 190 being provided with a plurality of spaced bores, not shown, so that a bolt 192 penetrating the handle 188 may be disposed in one of said bores for positioning the handle 188 at the desired position thus positioning the sliding closure plate 187 in the desired position to restrict the size of the opening 177 in the bottom plate 175 as desired or to close the same.

Figures 3, 4:
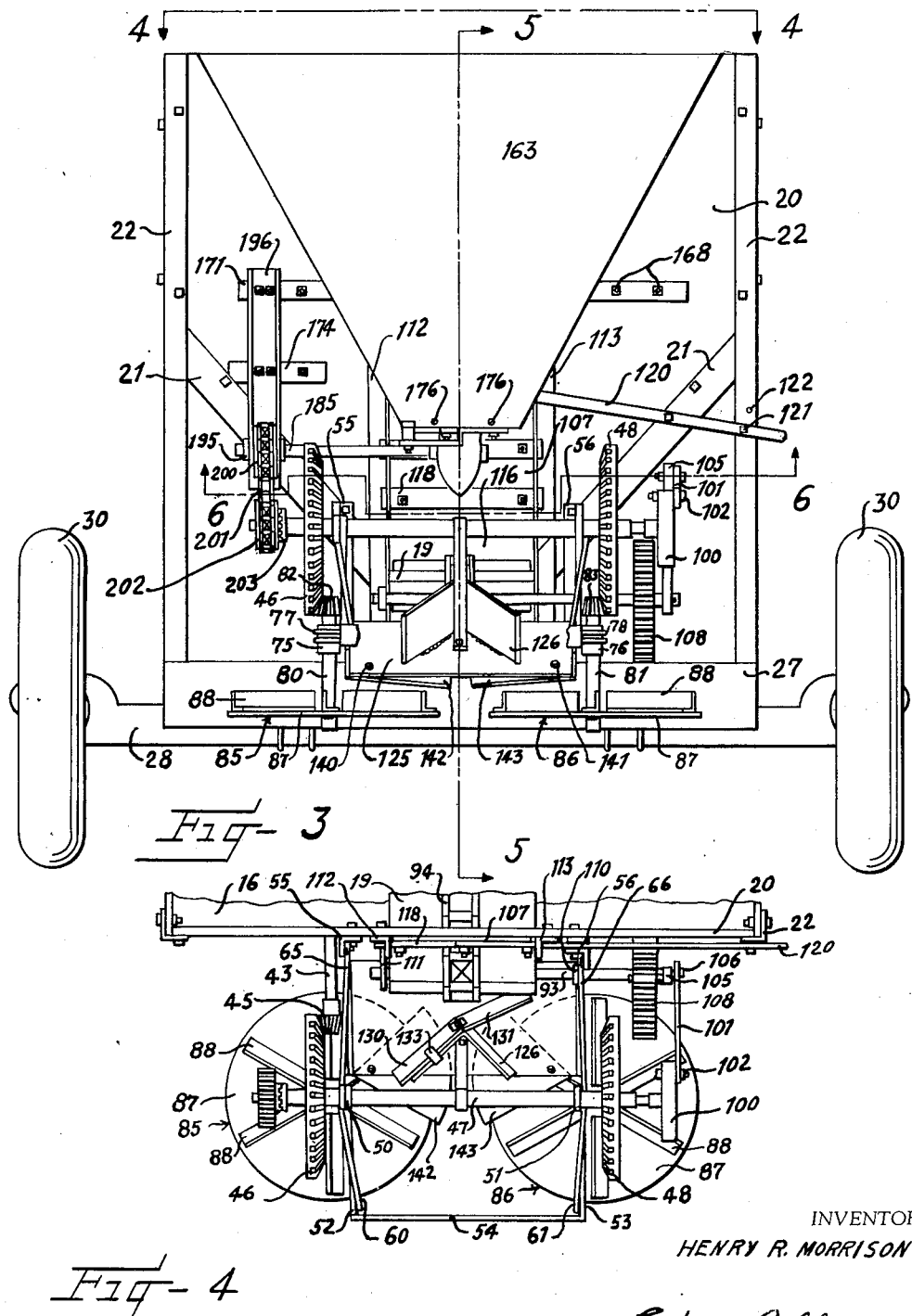
Figure 3 is an enlarged view of the broadcaster looking at the right-hand end of Figure 1.
Figure 4 is a top plan view of the rotors or fans and one mechanism for driving the same and showing the means for directing the angle at which material is distributed from the fans, the seed hopper being omitted.

The shaft 185 extends to the left in Figure 3 and is rotatably mounted in a bracket 195 suitably secured to a vertically disposed channel member 196 suitably secured to the spacer members 171 and 174 on the rear wall 20 of the hopper 16.

A sprocket wheel 200 is fixedly mounted on the shaft 185 between arms of the bracket 195 and has a sprocket chain 201 extending therearound and also extending over a sprocket wheel 202 fixedly mounted on the shaft 47 which has the beveled gears 46 and 48 mounted thereon and is driven through the shaft 43 by the power take-off of the tractor. It will thus be observed that as the shaft 47 is caused to rotate in a manner heretofore described, the sprocket wheel 202 will rotate in a like direction transmitting rotation to the sprocket wheel 200 and the shaft 185 which will cause the toothed wheel 183 disposed within the housing 180 to rotate to thus segregate and assist in distributing material such as seeds from the hopper 160.

A suitable manually operable clutch 203 is provided associated with the sprocket wheel 202 to permit the shaft 47 to rotate without rotating the sprocket wheel 202 when desired.

It is thus seen that there is provided an improved broadcaster having a hopper adapted to contain material such as fertilizer, said hopper having a bed plate extending longitudinally thereof and being provided with an endless conveyor on said bed plate and said conveyor having means secured thereto for moving materials from the front of said hopper to the rear thereof and for discharging the same onto a chute, and means being provided on the chute for diverting the material discharged thereon on to one or two rotors secured to the rear of the broadcaster and driven by connecting means connected to the power take-off of the tractor, and said connecting means also being connected with a cam wheel for actuating means for causing rotation of the conveyor in step-by-step movement to periodically discharge material from the hopper onto the rotors.

It is also seen that there is provided a second hopper adapted to contain material such as seed and means are provided for transmitting rotation from the power take-off through the connecting means for rotating the rotors and actuating the conveyor to rotate a toothed wheel disposed beneath the second hopper to cause material therein to be distributed therefrom and the second hopper also being provided with means to regulate the flow of materials therefrom.

By the use of this improved broadcaster, both fertilizer and seeds may be distributed from a single distributor or broadcaster and the amount thereof may be regulated as well as the angle at which the seeds and fertilizer are distributed and, if desired, they may be distributed from one side of the device or from both sides at any desired angle.

In the drawings and specification, there has been set forth a preferred embodiment of the invention, and although specific terms are employed, they are used in a descriptive and generic sense only and not for purposes of limitation, the scope of the invention being defined in the claims.

I claim:

1. A broadcaster adapted to be connected to a tractor having a power take-off thereon, said broadcaster having a hopper, said hopper having a longitudinally extending bed plate therein and having a discharge opening in the rear wall thereof adjacent said bed plate, an endless conveyor having its upper reach slidable on said bed plate, a chute secured to said hopper beneath the discharge opening, a pair of rotors rotatably mounted in spaced relation to each other at the rearmost end of said hopper and beneath said chute, means on said chute for selectively diverting material thereon onto one or both of said rotors, driving means connected to said rotors and to the power take-off of said tractor for transmitting rotation to said rotors and said driving means being provided with means for transmitting intermittent step-by-step rotation to said conveyor to cause material disposed in said hopper to be discharged therefrom by said conveyor onto said chute and said rotors to be broadcast from said rotors, means for manually varying the angle at which material is distributed from the rotors comprising a pair of plate members pivotally secured to the lower surface of said chute and adapted to be pivoted with their rearmost edges extending beyond the rearmost edge of said chute to thus cause material sliding from said chute to slide onto said plate members before striking said rotors, to thus permit the material to be directed to a predetermined point on said rotors to cause it to be broadcast at a line tangent to said predetermined point.

2. A broadcaster adapted to be connected to a tractor having a power take-off thereon, said broadcaster having a first hopper, said first hopper having a longitudinally extending bed plate therein and having a discharge opening in the rear wall thereof adjacent said bed plate, an endless conveyor having its upper reach slidable on said bed plate, a downwardly inclined chute secured to said first hopper beneath the discharge opening therein, a pair of rotors rotatably mounted in spaced relation to each other at the rearmost end of said hopper and beneath said chute, means on said chute for selectively diverting material thereon onto one or both of said rotors, driving means connected to said rotors and to the power take-off of said tractor for transmitting rotation to said rotors, said driving means being provided with means for intermittent step-by-step rotation to said conveyor to cause material disposed in said first hopper to be discharged therefrom onto said chute, said broadcaster also being provided with a second hopper secured to the rear end of the first hopper and said second hopper having an opening at its lower end, the opening therein being disposed above the chute extending from the discharge opening in said first hopper, said second hopper being adapted to carry material to be discharged through the opening therein onto said chute, to thus cause material from the first and second hoppers to be discharged onto said chute and to simultaneously slide therefrom onto the rotors to be distributed by the rotors, means for manually varying the angle at which material is distributed from the rotors comprising a pair of plate members pivotally secured to the lower surface of said chute and adapted to be pivoted with their rearmost edges extending beyond the rearmost edge of said chute to thus cause material sliding from said chute to slide onto said plate members before striking said rotors, to thus permit the material to be directed to a predetermined point on said rotors to cause it to be broadcast at a line tangent to said predetermined point.

3. A broadcaster adapted to be connected to a tractor having a power take-off thereon, said broadcaster having a first hopper, said first hopper having a longitudinally extending bed plate therein and having a discharge opening in the rear wall thereof adjacent said bed plate, an endless conveyor having its upper reach slidable on said bed plate, a downwardly inclined chute secured to said first hopper beneath the discharge opening therein, a pair of rotors rotatably mounted in spaced relation to each other at the rearmost end of said hopper and beneath said chute, means on said chute for selectively diverting material thereon onto one or both of said rotors, driving means connected to said rotors and to the power take-off of said tractor for transmitting rotation to said rotors, said driving means being provided with means for transmitting intermittent step-by-step rotation to said conveyor to cause material disposed in said first hopper to be discharged therefrom onto said chute, said broadcaster also being provided with a second hopper secured to the rear end of the first hopper and said second hopper having an opening at its lower end, the opening therein being disposed above the chute extending from the discharge opening in said first hopper, said second hopper being adapted to carry material to be discharged through the opening therein onto said chute, to thus cause material from the first and second hoppers to be discharged onto said chute and to simultaneously slide therefrom onto the rotors to be distributed by the rotors, a toothed wheel rotatably mounted on said second hopper beneath the opening therein and a driven connection between said driving means and said toothed wheel to cause rotation thereby to assist in distributing material from said second hopper, means for manually varying the angle at which material is distributed from the rotors comprising a pair of plate members pivotally secured to the lower surface of said chute and adapted to be pivoted with their rearmost edges extending beyond the rearmost edge of said chute to thus cause material sliding from said chute to slide on to said plate members before striking said rotors, to thus permit the material to be directed to a predetermined point on said rotors to cause it to be broadcast at a line tangent to said predetermined point.

4. A broadcaster adapted to be connected to a tractor having a power take-off thereon, said broadcaster having a hopper, said hopper having a longitudinally extending bed plate therein and having a discharge opening in the rear wall thereof adjacent said bed plate, an endless conveyor having its upper reach slidable on said bed plate, a chute secured to said hopper beneath the discharge opening, a pair of rotors rotatably mounted in spaced relation to each other at the rearmost end of said hopper and beneath said chute, means on said chute for selectively diverting material thereon onto one or both of said rotors, driving means connected to said rotors and to the power take-off of said tractor for transmitting rotation to said rotors and said driving means being provided with means for transmitting intermittent step-by-step rotation to said conveyor to cause material disposed in said hopper to be discharged therefrom by said conveyor onto said chute and said rotors to be broadcast from said rotors, said means for selectively diverting material comprising a right-angular plate member secured to said chute with its apex disposed in line with the discharge opening in said hopper to cause material to slide from said chute onto both rotors, and a hinged plate removably secured to said right-angular plate member and being movable to cause material to be diverted along said chute to only one of said rotors.

HENRY R. MORRISON.

REFERENCES CITED

The following references are of record in the file of this patent:

UNITED STATES PATENTS

| Number | Name | Date |
| --- | --- | --- |
| Re. 14,804 | Holden | Feb. 10, 1920 |
| Re. 19,801 | Mosgrove | Dec. 31, 1935 |
| 1,644,031 | Pulliam | Oct. 4, 1927 |
| 1,912,172 | Bailey | May 30, 1933 |
| 2,221,266 | Roach | Nov. 12, 1940 |
| 2,323,262 | Warren | June 29, 1943 |
| 2,340,657 | Goertzen | Feb. 1, 1944 |